United States Patent
Jones

[15] 3,640,628
[45] Feb. 8, 1972

[54] ELECTRO-OPTICAL TARGET ACQUISITION BLANKING SYSTEM

[72] Inventor: Sheldon Jones, Palos Verdes Estates, Calif.

[73] Assignee: Hughes Aircraft Company, Culver City, Calif.

[22] Filed: Dec. 18, 1969

[21] Appl. No.: 886,333

[52] U.S. Cl. ................................356/152, 356/4, 356/29, 89/41 L, 244/3.16, 250/203 R
[51] Int. Cl. ..........................................G01b 11/26
[58] Field of Search ..................356/1, 4, 5, 28, 29, 141, 152; 250/199, 215, 203, 204, 203 R; 33/49 A; 235/61.55; 244/3.16, 3.17; 89/41 L

[56] References Cited

UNITED STATES PATENTS

| | | |
|---|---|---|
| 3,380,358 | 4/1968 | Neumann ....................................356/5 |
| 2,884,829 | 5/1959 | Davies et al. .............................356/29 |
| 3,504,182 | 3/1970 | Pizzuro et al. ..........................250/199 |
| 2,967,449 | 1/1961 | Weiss.........................................356/28 |
| 3,341,707 | 9/1967 | Wingfield et al........................356/152 |
| 3,240,942 | 3/1966 | Birnbaum et al. ..........................178/6 |
| 3,339,457 | 9/1967 | Pun ..........................................89/41 L |

Primary Examiner—Rodney D. Bennett, Jr.
Assistant Examiner—Stephen Buczinski
Attorney—James K. Haskell and Walter J. Adam

[57] ABSTRACT

When an electro-optical tracking and ranging system is placed in proximity with the guns being controlled thereby, such as on the turret of a tank, there are a range of azimuth and elevation angles of the gun within which the flame present when the guns are being fired serves to temporarily disrupt the tracking process. Means are provided for sensing and/or anticipating the firing of the gun within the critical fields of azimuth and elevation angles and blanking the electro-optical detector over the interval of the occurrence of the gun flame. This prevents saturation of the detector by the gun flame and the disruption of the circuitry included therein which occurs otherwise.

11 Claims, 4 Drawing Figures

FIG. 2.

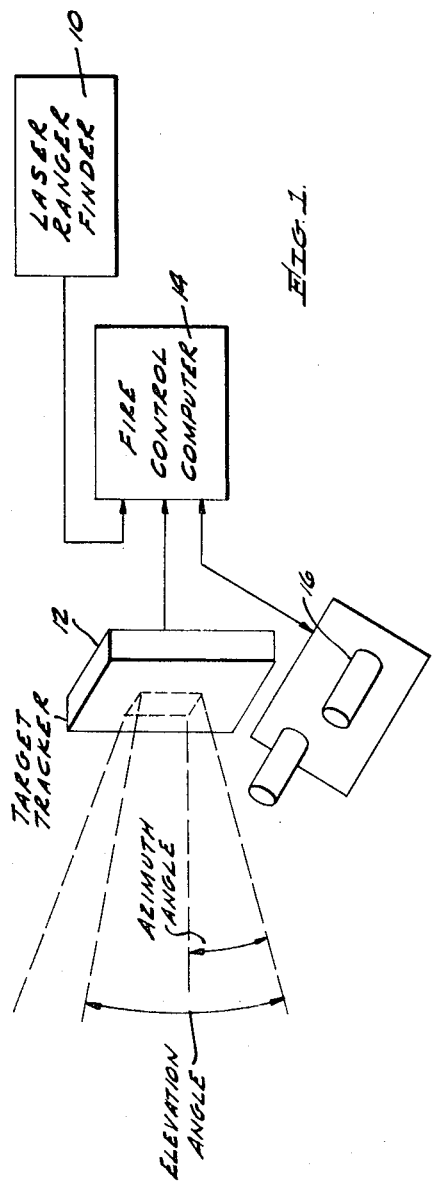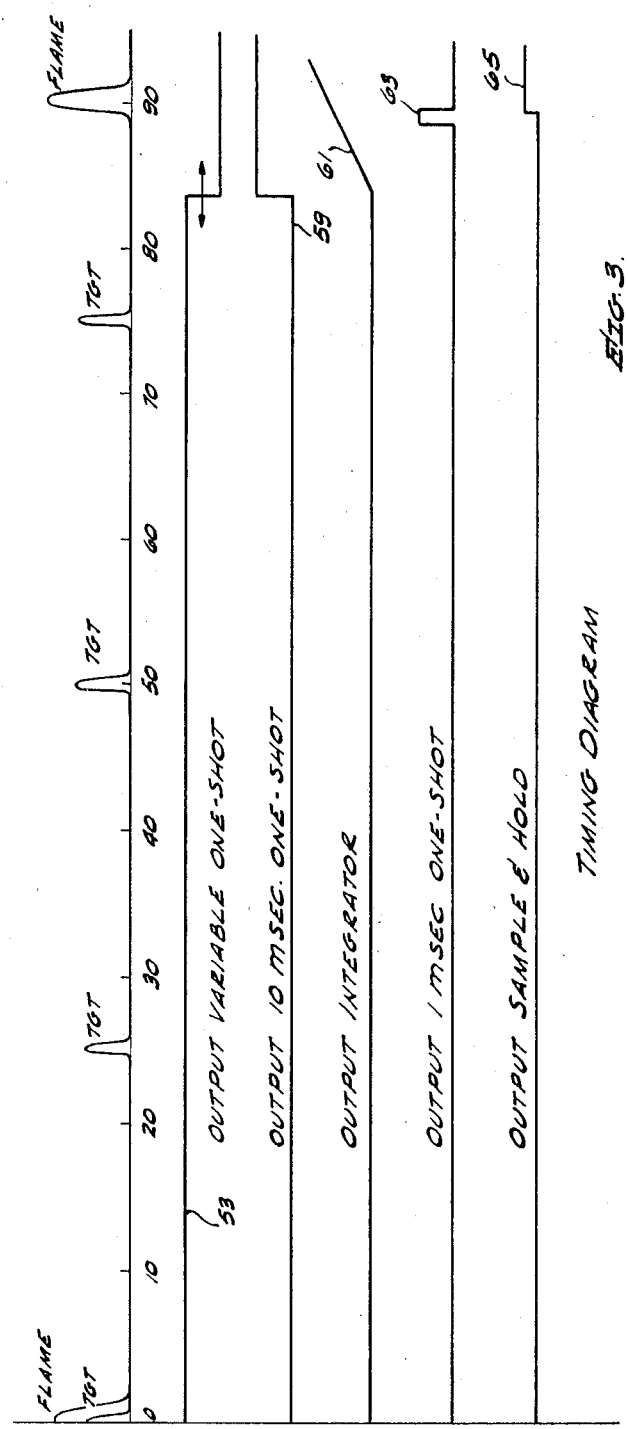

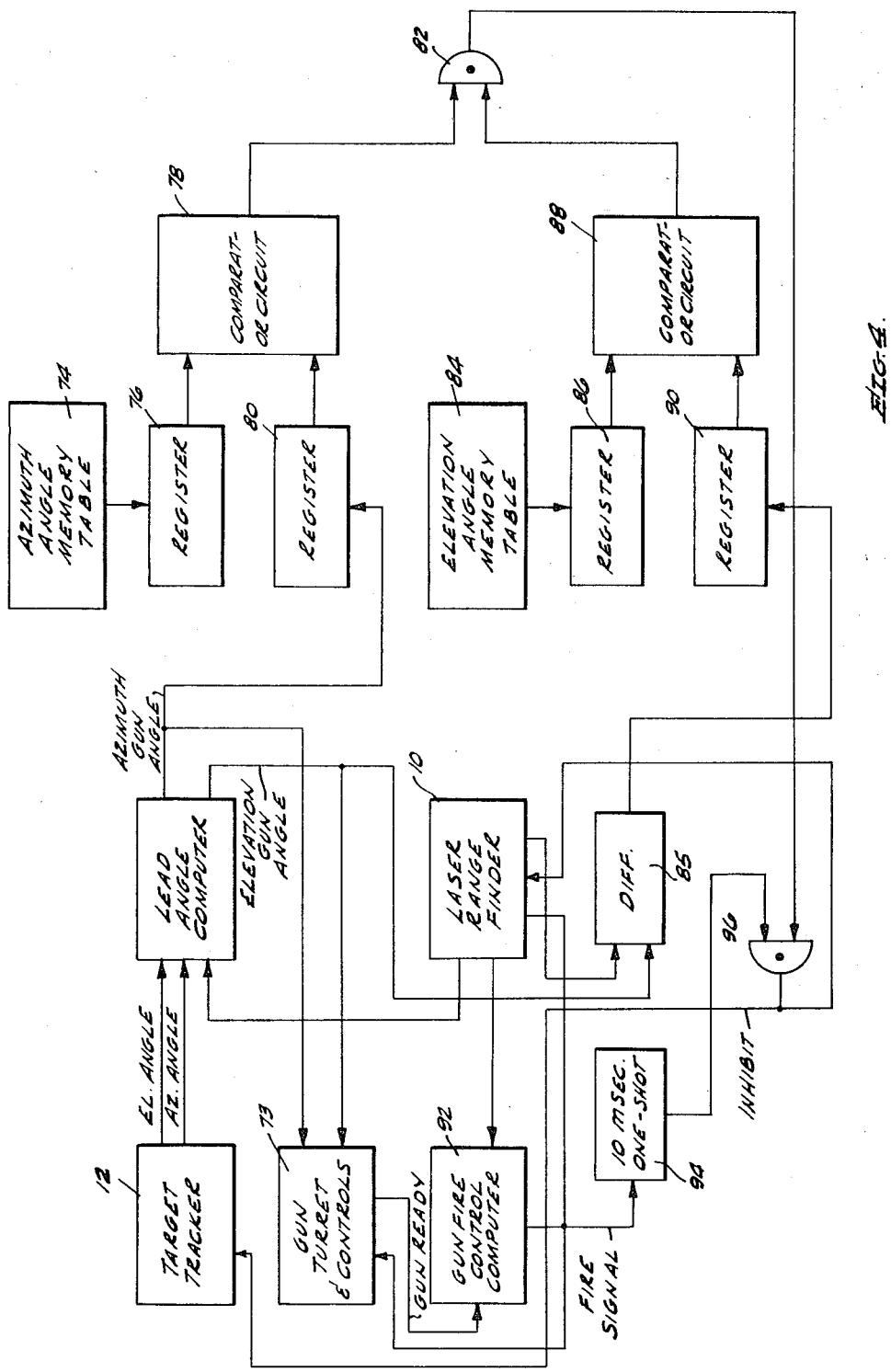

3,640,628

ELECTRO-OPTICAL TARGET ACQUISITION BLANKING SYSTEM

BACKGROUND OF THE INVENTION

This invention relates to electro-optical tracking systems and more particularly to an improved method and means for preventing disruption thereof due to the flame of a gun being fired under the control thereof.

In the fire control system of the turret guns of a tank, an infrared target-tracking system is employed. This normally includes a detector array which is positioned usually, between and above the guns. The tracking system normally tracks in response to infrared illumination emitted from the target. The infrared detectors are arranged in an array which scans an area. Ranging information including distance and velocity is supplied by a laser rangefinder. The laser beam is steered by the infrared target-tracking system.

When a target is acquired, the azimuth and elevation angle information are conveyed to a computer which also computes the distance and velocity, from information supplied by the laser rangefinder. The computer then computes the lead angle required in order that the projectile from the gun should strike the target. This information is then used to aim the guns. When the guns are properly aimed, then the computer generates a firing signal or firing signals.

The flame which is emitted from the barrel of the gun or guns which are fired may be as long as 1 meter in length. The flame normally lasts for several milliseconds and repeats with the frequency of the gun firing.

When the guns are pointing within a certain range of elevation angles and azimuth angles, the flame of the guns is within the field of view of the array of infrared detectors of the target tracker. The detector array used for acquisition has certain elements which are designated for fine tracking and other elements are used for coarse tracking. In normal tracking, the flame is not a problem until it interferes with the fine tracking field of view of the detector array elements. The response of the detector to the hot flame of the gun causes a spurious signal, which is sufficient to disrupt the tracking process until the circuitry can recover. This disruption can be sufficiently long so that the target can be lost and must be reacquired

OBJECTS AND SUMMARY OF THE INVENTION

An object of this invention is the provision of an arrangement for preventing the gun flame from disrupting the tracking process of an infrared tracking system.

Another object of this invention is the provision of an arrangement whereby an infrared electro-optical tracking system can track substantially continuously despite the presence of an intermittent gun flame within its field of view.

Yet, another object of the present invention is the provision of a novel and useful arrangement for improving the effectiveness of an infrared target-tracking system despite the presence of intermittent gun flame within the field of view.

These and other objects of the invention are achieved, in one embodiment of the invention, by sensing the presence of the gun flame using the coarse detectors in the target-tracking detector array. From prior knowledge of the firing interval of the gun and also from prior knowledge of the duration of the presence of flame for a particular gun, the detectors of the tracking system can be blanked just prior to the occurrence of the next flame and over the interval thereof. Intervals between firing are continuously measured in order that the blanking interval can be updated for each succeeding shot. This is done because the rate of firing may change as the gun warms up. The blanking is discontinued when the gun is not fired at the prescribed interval. While the blanking of the IR video results in some loss of the tracking data rate, this data rate occurs at such a higher frequency than the gun-firing rate that it does not significantly affect tracking performance.

In a second embodiment of the invention, the blanking or inhibiting signal for the detector array is provided by the data from a central computer. This central computer has stored in memory the range of azimuth and elevation angles of the gun or guns which, when fired, will provide flame in the field of view of the detector array. From the information as to the required azimuth and elevation angle of the guns for firing upon the target, and from information as to when the firing signal is to occur, the computer can provide a properly timed blanking signal for the detector array.

The novel features of this invention are set forth with particularity in the appended claims. The invention will best be understood from the following description when read in conjunction with the accompanying drawings.

BRIEF DESCRIPTION OF THE DRAWINGS

FIG. 1 is a schematic representation of a detector and guns illustrating how the flame from the guns may intersect the field of view of the detector.

FIG. 3 comprises a timing diagram which is provided to assist in an understanding of the operation of FIG. 2.

FIG. 4 is a block diagram of a second embodiment of this invention.

DESCRIPTION OF THE PREFERRED EMBODIMENTS

Figure 2:
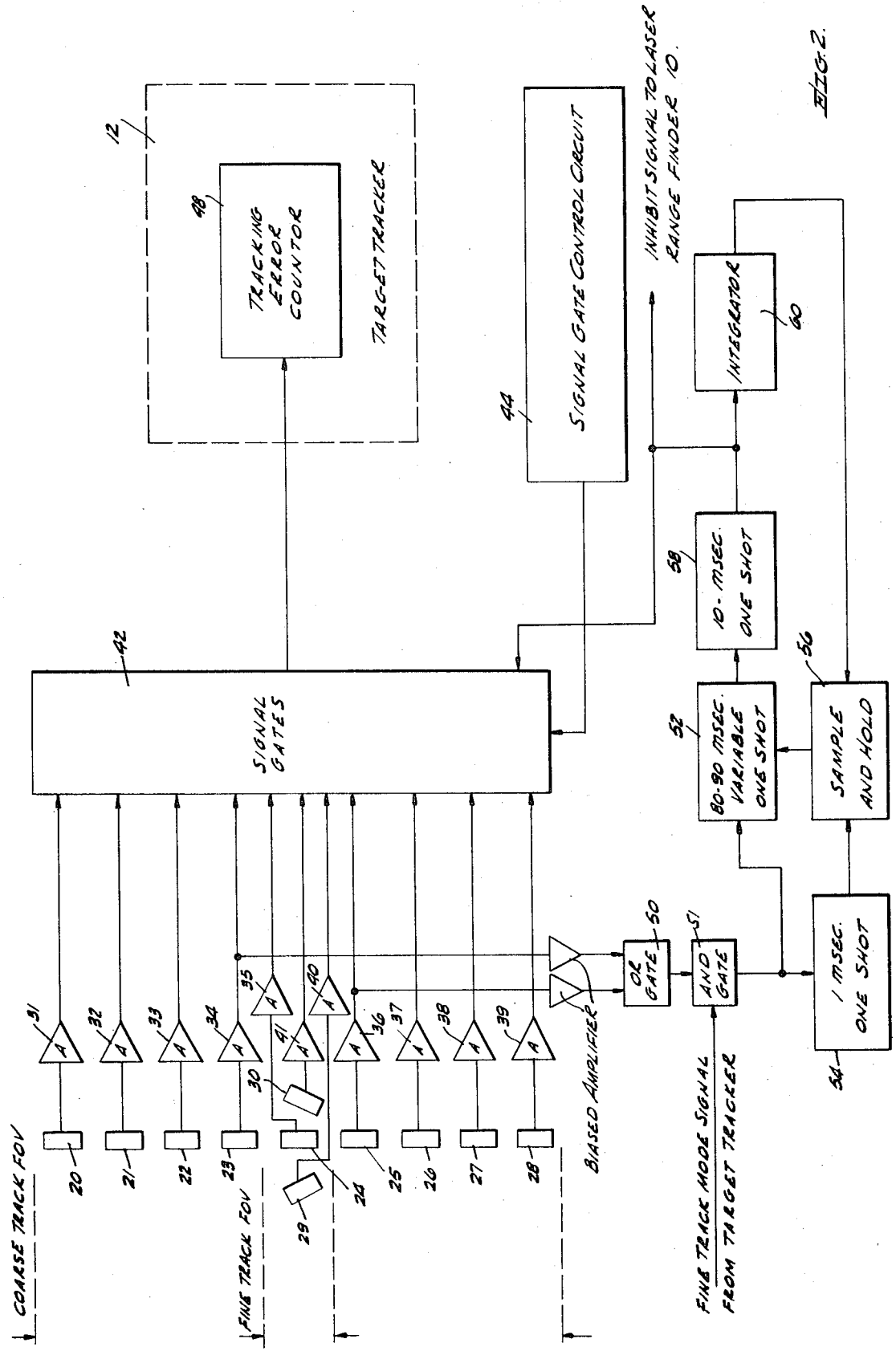
FIG. 2 is a schematic diagram illustrating an embodiment of this invention.

Referring now to FIG. 1 a laser rangefinder 10 and an infrared target tracker 12 supply target-tracking information to a fire control computer 14. The fire control computer 14 processes the information received and aims guns 16 at the target in response to the processed information and then provides a firing signal. In the tracking mode of operation, the pointing is under control of the infrared target tracker 12. After the target is acquired the computer controls the gun-pointing.

The target tracker and the guns are movable respectively for scanning for the purpose of acquiring targets, and for the purpose of being directed at the target acquired. Should the guns be pointed so that the flame emitted from their muzzles when they are fired intersects the scanning field of the target tracker, as defined by the dotted lines in FIG. 1, as previously pointed out, the intense spurious signal caused by the gun flames can saturate the target detector circuitry for periods sufficiently long to cause the target to be lost. As a result, a new target acquisition cycle must be gone through. Since most targets are either moving vehicles or flying planes, the result of saturation due to a gun flame occurring in the target detector field of view may very well result in a loss of the target.

FIG. 2 is a block diagram illustrative of an embodiment of this invention. The rectangles designated by reference numerals 20 through 30 represent the array of infrared detectors, each followed by its own amplifier respectively 31 through 41. Each one of the amplifiers connects to a separate gate, collectively represented as the signal gates 42. These signal gates are controlled in the usual manner from signal gate control circuits 44. The gates are turned on in sequence by the signal gate control circuit 44, and their outputs, comprising a time-multiplexed signal are supplied to the tracking error generating circuits and servo 48, portion of the infrared target tracker 12. The tracking error generating circuits and servo, is an arrangement for accurately locating the target position from information supplied by the detectors and moving the pointing assembly to position the target in the center of the tracking field.

Detector elements 20 through 23, and 24 through 28 constitute the coarse track elements, and the field of view which they circumscribe is known as the coarse track field of view. The elements 24, 29 and 30, which are in a "chevron" array are known as the fine track field of view.

When the presence of a gun flame is sensed by either detector 23 or 25 they provide an output to an OR-gate 50. OR-gate 50 output is applied to an AND-gate 51.

Whenever the system is in fine track mode, i.e., target acquired, a fine track mode signal provided by the target-tracking detector is used to enable AND-gate 51. AND-gate 51 in the simultaneous presence of its two input signals provides an output to two one-shot circuits respectively 52, 54. The one-shot circuit 52 provides an output pulse whose duration is variable between 80 to 90 milliseconds. The one-shot circuit 54 provides an output pulse having a duration of 1 millisecond.

Reference may also now be made to the timing diagram shown in FIG. 3, to assist in an understanding of the explanation of the operation of FIG. 2. It will be seen that target signals which are detected by the tracker occur approximately every 25 milliseconds. The flame signals detected by the target tracker which are provided by the gun shots occur approximately every 90 milliseconds. In response to the output of AND-gate 51, the one-shot 52 provides an output 53, having a pulse width which can be varied between 80 and 90 milliseconds. The duration is under control of the output voltage signal level of a sample and hold circuit 56.

When the one-shot 52 is reset, its output triggers a following one-shot 58. This following one-shot has an output which has a duration of 10 milliseconds. This is represented in FIG. 3 by the 10-milisecond pulse 59. This 10-millisecond pulse is the inhibit signal which is fed to the signal gates 42 to blank them off for 10 milliseconds. The interval of 10 milliseconds has been determined as being the interval required to bracket the longest possible variation in the occurrence of a gun flame signal. It is preferred to place the gun flame pulse within the middle of this 10-millisecond pulse. To do this the system is updated each time the gun flame is detected. The 10-millisecond pulse output from one-shot 58 is not only used to inhibit the signal gates but also to inhibit the Laser Rangefinder. This one-shot 58 output is also fed to an integrator 60, to be integrated. The output of the integrator 61b, as is shown in FIG. 3, is applied to the sample and hold circuit 56, input. In response to the next gun-firing which happens between 80 and 90 milliseconds later, the 1-millisecond output from the one-shot circuit 54 determines when the integrated circuit output is sampled. This sampled signal is retained by the sample and hold circuit 56. The one millisecond one-shot output is represented by the pulse waveform 63 in FIG. 3, and the level of the sample and hold circuit output is represented by the waveform 65. The level of the signal retained in the sample and hold circuit determines the time when the one-shot 52 resets and thus the time of the end of the waveform 53.

Variations in time of occurrence of the flame of the gun vary the time of occurrence of the output of the AND-gate 51. The time of initiation of the inhibit pulse output of the 10-millisecond one-shot is varied accordingly in view of the fact that the output of the sample and hold circuit will vary the duration of the output of one-shot 52.

Since the azimuth and elevation angles at which the guns are pointed, are in response to the instructions of the fire control computer, and since the fire control computer also knows the azimuth and elevation angles of the target tracker field of view, there is information available from which it can be determined for what azimuth and elevation angles of the guns, the muzzle fire will cross the field of view of the target tracker to cause problems.

The flame from the fired gun will not exceed 1 meter in length under the worst conditions. The gun length plus 1 meter of flame determines a specific set of differential elevation angles for which a possible intersection with the IR tracker exists. The differential angle is the difference in angle between IR tracker and gun elevation angle, since there is some difference therebetween in operation. The other necessary condition is that the gun lead angle in azimuth fall between certain values. Accordingly, all that is required is to store the "obscuration" angles in the computer memory and to compare these with the calculated gun-firing angles. If the calculated gun-firing angles fall within the region of the obscuration angles, then, an inhibit signal of the proper duration can be generated when the computer instructs the guns to fire and this can be used to inhibit the target tracker detecting gates and the laser range finder.

FIG. 4 is a block diagram of an arrangement for accomplishing this. The target tracker 12 provides as its output the target elevation angle; the target azimuth angle, and the information from which velocity can be computed is provided by the laser rangefinder 10. This information is operated on by that portion of the fire control computer 14 which can be designated as the lead angle computer 72. The output of this section of the computer comprises azimuth plus lead angle or azimuth gun angle and elevation plus lead angle, or elevation gun angle signals.

The azimuth obscuration angles may be stored in a separate memory or separate portion of the computer memory designated as the azimuth memory table 74. This can be either a magnetic drum or disk or cyclically read read-only memory, whose output to a register 76, comprises the azimuth obscuration angles. The output of register 76 is applied to a comparator circuit. The other input to the comparator circuit 78 are the contents of a register 80, into which the azimuth gun angle data is entered from the lead angle computer.

Comparator circuit 78 is a circuit which produces an output signal when the azimuth gun angle equals or is greater than the angles read from the azimuth memory table. The comparator circuit output is then applied to an AND-gate 82.

An elevation angle memory table 84, stores differential obscuration elevation angles. Its output is applied to a register 86, which in turn applies its contents to a comparator circuit 88. The elevation gun angle number is applied to a difference circuit 85 together with the laser rangefinder elevation angle. The differential gun-angle output of the difference circuit is applied to register 90. This register applies its output to the comparator circuit 88. Comparator circuit 88 provides an output when the differential gun elevation angle is equal to or exceeds the angles which are read into the register 86. The output of the comparator circuit 88 is applied to the AND-gate 82.

It should be noted that the data readout from both azimuth angle memory table and elevation memory table into the registers should both be fast enough so that the table is read through once for every angle with which it is to be compared.

The gun controls in the gun turret are instructed to fire by the gun firing control computer 92, which is the portion of the fire control computer 14, which receives a gun "ready to fire" signal from the gun turret and control 73. The gun fire control computer then provides the fire signal to the gun turret controls and also to a 10-millisecond one-shot 94. This provides an output pulse which is 10 milliseconds long to an AND-gate 96. The AND-gate 96 is enabled in the presence of an output from AND-gate 82. The output of AND-gate 96 is an inhibit signal which inhibits the signal gates of the target tracking detectors as well as the laser rangefinder 10 for 10 milliseconds. There is enough delay between the occurrence of the inhibit signal and the time that the guns respond to the fire signal so that the target tracker circuitry will be inhibited just prior to and over the interval of the gun flame. Gun fire control computers of the type described are well known and therefore will not be redescribed here.

An infrared target-tracking system exemplary of the type referred to hereinabove, with which this invention may be employed is shown and described in an application U.S. Ser. No. 849,218, filed Aug. 11, 1969, entitled TARGET SEARCH AND TRACK SYSTEM WITH DUAL MOD SCAN CAPABILITY, by Raymond W. Briggs and assigned to a common assignee.

A laser rangefinder exemplary of the type referred to hereinabove is found described in U.S. Ser. No. 849,219, filed Aug. 11, 1969, entitled INTEGRATED INFRARED-TRACKER-RECEIVER LASER-RANGEFINDER TARGET SEARCH AND TRACK SYSTEM, by Sheldon Jones and Raymond W. Briggs, and assigned to a common assignee.

There has been described and shown hereinabove a novel and useful arrangement for determining when the sensitive elements of an optical target-tracking system are pointing in a direction such that the fire emitted from the muzzle of a gun which is controlled in response to the output of the target-tracking system, will occur in the field of view of the target-tracking system. A blanking signal is generated just before the guns are fired which blanks the sensitive elements of the target-tracking system long enough to permit the gun fire to subside, whereby target-tracking, the prime function of the equipment, is not interfered with.

What is claimed is:

1. In a system in which a repeatedly fired gun may be pointed in a direction such that when discharged, the flame emitted from the gun will traverse the angular field of view of an infrared target tracker, a system for minimizing the adverse effects of said gun flame on said target tracker comprising detector means within said target tracker for sensing the flame caused within the angular field of view by a plurality of gun-firings and producing a flame-timing signal representative of the time of occurrence of said flame within the angular field of view of said target tracker, means responsive to said flame-timing signal for generating an inhibit signal which commences prior to the flame caused by the firing of said gun and terminates subsequent thereto;

means for inhibiting the response of said target tracker and including gate means coupling the detector means of said target tracker to the remaining target tracker structure, and means for applying said inhibit signal to said gate means for inhibiting the response of said target tracker.

2. In a system as recited in claim 1 wherein said means responsive to said flame-timing signal for generating an inhibit signal which commences prior to the flame caused by a firing of said gun and terminates subsequent thereto, includes:

a first one-shot circuit for generating a pulse commencing at the time of said flame-indicating signal and terminating subsequently at a controllable time, a second one-shot circuit for generating an inhibit signal at the termination of the output of said first one-shot circuit, and means responsive to the succeeding flame-timing timing signal for controlling the establishment of the termination of said first one-shot pulse at time such that the occurrence of the flame will be substantially within the center of the inhibit pulse interval.

3. In a system as recited in claim 2 wherein the means responsive to the succeeding flame-timing signal for controlling the establishment of the termination of said first one-shot pulse at time such that the occurrence of the flame will be substantially within the center of the inhibit pulse interval includes:

an integrating circuit connected to the output of said second one-shot circuit for integrating said output, a third one-shot circuit responsive to said flame-indicating circuit for providing an output pulse, a sample and hold circuit, means for applying the output of said integrating circuit to said sample and hold circuit, means for actuating said sample and hold circuit responsive to the output pulse of said third one-shot circuit, and means for applying the output of said sample and hold circuit to said first one-shot circuit for controlling the establishment of the time of termination of said first one-shot output pulse responsive to the amplitude of said sample and hold circuit output.

4. In a system as recited in claim 1 wherein there is included a laser rangefinder system, and means for inhibiting the response of said target tracker includes:

means for inhibiting said laser rangefinder over an interval including the interval of occurrence of said gun flame.

5. In a system as recited in claim 1 wherein there is included a laser rangefinder system, and means for inhibiting the response of said target tracker includes:

means for inhibiting said laser rangefinder over an interval including the interval of occurrence of said gun flame.

6. In a system in which a repeatedly fired gun may be pointed in a direction such that when discharged, the flame emitted from the gun will traverse the field of view of an infrared target tracker comprising means for storing a table of azimuth obscuration angles within a first memory system, means for storing a table of elevation obscuration angles within a second memory system, means for computing the azimuth and elevation angles to which said gun will be pointed in order to hit a target being tracked by said target tracker, means for comparing the azimuth angle to which said gun will be pointed with the table of azimuth obscuration angles stored in said first memory system and producing a first obscuration signal when the azimuth angle to which said gun is to be pointed equals or exceeds the angles in said table of obscuration angles, means for comparing the elevation angle to which said gun will be pointed with the table of elevation obscuration angles stored in said second memory system and producing a second obscuration signal when the deviation angle to which said gun is to be pointed equals or exceeds the angles in said table of obscuration angles, means for producing a signal for instructing said gun to fire when it has reached the computed azimuth and elevation angles, and means to which said signal for instructing said gun to fire and said first and second obscuration signals are applied for generating an inhibit signal having a duration greater than the interval of said gun flame, means for inhibiting the response of said target tracker over an interval including the interval of the occurrence of said flame and including gate means coupling the detector means of said target tracker to the remaining target tracker structure, and means for applying said inhibit signal to inhibit said gate means.

7. In a system in which a repeatedly fired gun may be pointed in a direction such that when discharged the flame emitted from the gun will traverse the field of view of an infrared target tracker, said target tracker having a first plurality of detectors scanning a coarse field of view and a second plurality of detectors scanning a fine field of view, a system for minimizing the adverse effects of said gun flame on said target tracker comprising:

OR gate means connected to predetermined ones of said first plurality of detectors for producing an output responsive to the occurrence of a gun flame, means in said target tracker for generating a fine track signal responsive to said target tracker acquiring a target within its fine field of view, circuit means responsive to said OR gate means output and said fine track signal for generating an inhibit signal just prior to the occurrence of the succeeding gun flame and having a duration greater than that of said gun flame, and means for inhibiting the response of said target tracker responsive to said inhibit signal.

8. In a system as recited in claim 7 wherein said circuit means includes:

a first one-shot circuit for generating a pulse commencing at the time of said flame-indicating signal and terminating subsequently at a controllable time, a second one-shot circuit for generating an inhibit signal at the termination of the output of said first one-shot circuit, and means responsive to the succeeding flame-indicating signal for controlling the establishment of the termination of said first one-shot pulse at time such that the occurrence of the flame will be substantially within the center of the inhibit pulse interval.

9. In a system as recited in claim 8 wherein the means responsive to the succeeding flame-indicating signal for controlling the establishment of the termination of said first one-shot pulse at time such that the occurrence of the flame will be substantially within the center of the inhibit pulse interval includes:

an integrating circuit connected to the output of said second-shot circuit for integrating said output, a third one-shot circuit responsive to said flame-indicating circuit for providing an output pulse, a sample and hold circuit, means for applying the output of said integrating circuit to said sample and hold circuit, means for actuating said sample and hold circuit responsive to the output pulse of said third one-shot circuit, and means for applying the output of said sample and hold circuit to said first one-shot circuit for controlling the establishment of the time of termination of said first one-shot output pulse responsive to the amplitude of said sample and hold circuit output.

10. In a system as recited in claim 9 wherein there is included a laser rangefinder system, and means for inhibiting the response of said target tracker includes:

means for inhibiting said laser rangefinder over an interval including the interval of occurrence of said gun flame.

11. In a system in which a repeatedly fired gun may be pointed in a direction such that when discharged, the flame emitted from the gun will traverse the field of view of an infrared target tracker, a system for minimizing the adverse effects of said gun flame on said target tracker comprising:

means for determining when the gun flame will occur within the field of view of said target tracker including:

means for storing a table of azimuth obscuration angles within a first memory system, means for storing a table of elevation obscuration angles within a second memory system, means for computing the azimuth and elevation angles to which said gun will be pointed in order to hit a target being tracked by said target tracker, means for comparing the azimuth angle to which said gun will be pointed with the table of azimuth obscuration angles stored in said first memory system and producing a first obscuration signal when the azimuth angle to which said gun is to be pointed equals or exceeds the angles in said table of obscuration angles, means for comparing the elevation angle to which said gun will be pointed with the table of elevation obscuration angles stored in said second memory system and producing a second obscuration signal when the deviation angle to which said gun is to be pointed equals or exceeds the angles in said table of obscuration angles, means for producing a signal for instructing said gun to fire when it has reached and computed azimuth and elevation angles, and means to which said signal for instructing said gun to fire and said first and second obscuration signals are applied for generating an inhibit signal having a duration greater than the interval of said gun flame;

means for applying said inhibit signal to said target tracker to inhibit any response thereof to said gun flame.

\* \* \* \* \*